(12) United States Patent
Stuple et al.

(10) Patent No.: US 7,577,914 B1
(45) Date of Patent: Aug. 18, 2009

(54) AUTOMATICALLY SIZED COMPUTER-GENERATED WORKSPACES

(75) Inventors: Stuart J. Stuple, Carnation, WA (US); Owen C. Braun, Seattle, WA (US); Christopher H. Pratley, Seattle, WA (US); Alex J. Simmons, Seattle, WA (US); Timothy D. Sellers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 10/180,231

(22) Filed: Jun. 26, 2002

(51) Int. Cl.
*G06F 3/048* (2006.01)
*G06F 17/21* (2006.01)

(52) U.S. Cl. .................... 715/764; 715/247; 715/786; 715/788

(58) Field of Classification Search ............... 715/764, 715/781, 788, 800, 778, 864, 740, 785, 784, 715/786, 787, 508, 502, 517, 520, 521; 345/684; 382/189
See application file for complete search history.

(56) References Cited

U.S. PATENT DOCUMENTS

| | | | | |
|---|---|---|---|---|
| 5,220,649 A | * | 6/1993 | Forcier | 715/273 |
| 5,666,498 A | * | 9/1997 | Amro | 715/800 |
| 5,847,706 A | * | 12/1998 | Kingsley | 715/788 |
| 6,141,008 A | * | 10/2000 | Bloomfield | 715/800 |
| 6,167,376 A | * | 12/2000 | Ditzik | 704/235 |
| 6,313,854 B1 | * | 11/2001 | Gibson | 715/788 |
| 6,414,698 B1 | | 7/2002 | Lovell et al. | 715/800 |
| 6,473,102 B1 | * | 10/2002 | Rodden et al. | 715/788 |
| 6,547,830 B1 | | 4/2003 | Mercer | 715/518 |
| 6,570,588 B1 | * | 5/2003 | Ando et al. | 715/728 |
| 6,603,493 B1 | | 8/2003 | Lovell et al. | 715/800 |
| 2002/0149623 A1 | * | 10/2002 | West et al. | 345/765 |
| 2003/0226113 A1 | * | 12/2003 | Altman et al. | 715/520 |
| 2003/0234809 A1 | * | 12/2003 | Parker et al. | 345/740 |

OTHER PUBLICATIONS

Microsoft WordPad. Copyright 1981-2001. Microsoft Corporation.*
Poupyrev, Ivan et al., "Virtual Notepad: Handwriting in Immersive VR", *IEEE*, 1998, pp. 126-132.

(Continued)

*Primary Examiner*—Kieu Vu
*Assistant Examiner*—Blaine T. Basom
(74) *Attorney, Agent, or Firm*—Merchant & Gould, P.C.

(57) ABSTRACT

A method and system are provided for automatically sizing computer-generated workspaces to allow users to enter data anywhere in an available workspace. A calculation is performed to determine the total available workspace displayable by a display device based on the size of the display device. The space required to display user interface objects, such as toolbars and task panes, is subtracted from the total available workspace, and the remaining available workspace is designated as the displayed workspace. The workspace is displayed without the use of scroll bars to create a user experience that the displayed workspace is the total available workspace. Data may be entered anywhere in the displayed workspace without regard to any preformatted page sizes or margins. If data is entered outside the displayed workspace, scroll bars are then displayed to indicate the presence of content outside the displayed workspace. As additional content, such as graphical user interfaces is displayed, or when the user's display device changes, the displayed workspace is recalculated.

28 Claims, 5 Drawing Sheets

OTHER PUBLICATIONS

Campbell, George, "The Write Stuff: 15 Essential Tips for Smarter, Faster Word Processing-No Matter Which Version of Word or WordPerfect You Use", *PC World*, Feb. 2002, vol. 20, No. 2, pp. 7, 10, 93-98.

U.S. Appl. No. 10/233,060, filed Aug. 30, 2002, entitled "Best Fit Printing", Inventors: Sellers et al.

Antonacopoulos, A., "Page Segmentation Using the Description of the Background", *Computer Vision and Image Understanding*, vol. 70, No. 3, Jun. 1998, pp. 350-359.

U.S. Official Action dated Feb. 21, 2006 in U.S. Appl. No. 10/233,060.

* cited by examiner

AUTOMATICALLY SIZED COMPUTER-GENERATED WORKSPACES

FIELD OF THE INVENTION

The present invention relates to a method and system for providing automatically sizing computer-generated workspaces.

BACKGROUND OF THE INVENTION

Computer software applications allow users to create a variety of documents in work, education, and leisure. For example, word processing applications allow users to create letters, articles, books, memoranda, and the like. Spreadsheet programs allow users to store, manipulate, print, and display a variety of alpha-numeric data. Such applications have a number of well-known strengths, including rich editing, formatting and calculation. In recent years, use of such computer software applications has been expanded to include traditional desktop computers, laptop computers, and a variety of handheld electronic devices, including handheld personal computers, and personal digital assistants. Moreover, in recent years, a variety of data input methods have been created to include keyboard entry, voice recognition entry, and handwriting recognition entry. In a typical handwriting recognition entry system, a user is allowed to handwrite data directly onto the display screen of her computing device as a method of data entry.

Typical software application programs, as described above, present on the display screen of the user's computing device a workspace in which the user may input or manipulate data. Typically for spreadsheet applications, the workspace available to the user may appear as if it includes all space on the display screen of the user's computing device except for areas in which some object is located such as a graphical user interface object. However, in most word processing systems, the actual workspace available to the user is some reduced area displayed on the user's display screen as dictated by a preformatted page size. For example, if the user has a very large computer display screen, such as a 21-inch display screen, the user may think of all of the physically available area on the display screen as an area in which the user may input data. However, if the software application used by the user, for example a word processing application, has a preformatted page size of 8½ inches by 11 inches, once the user's text reaches a margin set by the software application for operation within the confines of that page size, the user's data will wrap to the next line. Therefore, the user's data input experience is confined to pre-determined space limitations based on preformatted page sizes.

In recent years, more and more software applications are being developed that allow users a free form data input experience. For example, with respect to the handwriting recognition systems, the user may touch a stylus to any location in the available workspace to enter data. Unfortunately, even with such free form methods of data input, the users confinement to a preformatted page size or workspace reduces the free form nature of the user experience. When users handwrite notes or draw images on a sheet of paper using a pen or pencil, users naturally use the entire sheet of paper and often write text or draw images without any particular document structure.

There is a need in the art for a method and system of automatically sizing computer-generated workspaces to allow a user to input data anywhere in the available workspace according to the size and shape of the user's display device. There is further a need for a method and system of automatically sizing workspaces to allow the workspace to grow in any direction to allow the user to input data to the right, left, above, or below existing data without regard to preformatted margins or page sizes.

It is respect to these noted considerations that the present invention has been made.

SUMMARY OF THE INVENTION

The present invention provides a method and system for automatically sizing computer-generated workspaces to allow users to enter data anywhere in an available workspace. When a user opens a computer software application having a workspace according to an embodiment of the present invention, a calculation is performed to determine the total available workspace based on the size of the display device in use by the user. Once the total available space is calculated, the space required to display user interface objects, such as toolbars and task panes, is subtracted from the total available workspace, and the remaining available workspace is designated as an area in which data may be input. The workspace is displayed without the use of scroll bars to create a user experience that the displayed workspace is the total available workspace.

Once the workspace is designated, data may be entered anywhere in the total available workspace without regard to any preformatted page sizes or margins. If the user desires to move above, below, to the right or to the left of the currently displayed workspace, the workspace allows the user to move in any desired direction to place data in the available workspace. As additional content, such as graphical user interfaces is displayed, or when the user's display device changes, the displayed workspace is recalculated. For example, if the user launches a task pane that is displayed by the user's display device, the displayed workspace is recalculated to subtract the space required by the task pane. If text, images, or other data had been displayed in the area now used by the launched task pane, a scroll bar is displayed to indicate that content is available in the direction now taken up by the task pane.

The total available workspace and the associated display of data and user interfaces contained therein is also recalculated and redisplayed if the user copies all the data to a different device having a larger or smaller total available workspace. For example, if the user has the data on a small handheld device where a portion of the data is not visible on the displayed workspace requiring the inclusion of scroll bars to indicate the data is available off the displayed workspace, and that data is moved to a device having a large display screen such as a 21-inch computer monitor, the total available workspace of the computer monitor will be calculated according to the present invention and the data copied from the small hand-held device will be copied to the larger display device in the same exact proportions it was displayed in the small hand-held device. Accordingly, the scroll bars required by the hand held device will be eliminated, and a much greater displayed workspace will be displayed beyond what appeared to be available on the small hand-held device. Accordingly, the user gets the experience that all unused space on any size display screen is available for data input.

These and other features, advantages, and aspects of the present invention may be more clearly understood and appreciated from a review of the following detailed description of the disclosed embodiments and by references to the appended drawings and claims.

DETAILED DESCRIPTION

The following description of an embodiment of the present invention is made with reference to the above-described drawings wherein like numerals refer to like parts or components throughout the several figures. The present invention is directed to a method and system for automatically sizing computer-generated workspaces to allow users to use as much workspace as they desire without regard to margins or other preformatted space limitations.

Operating Environment

Figure 1:
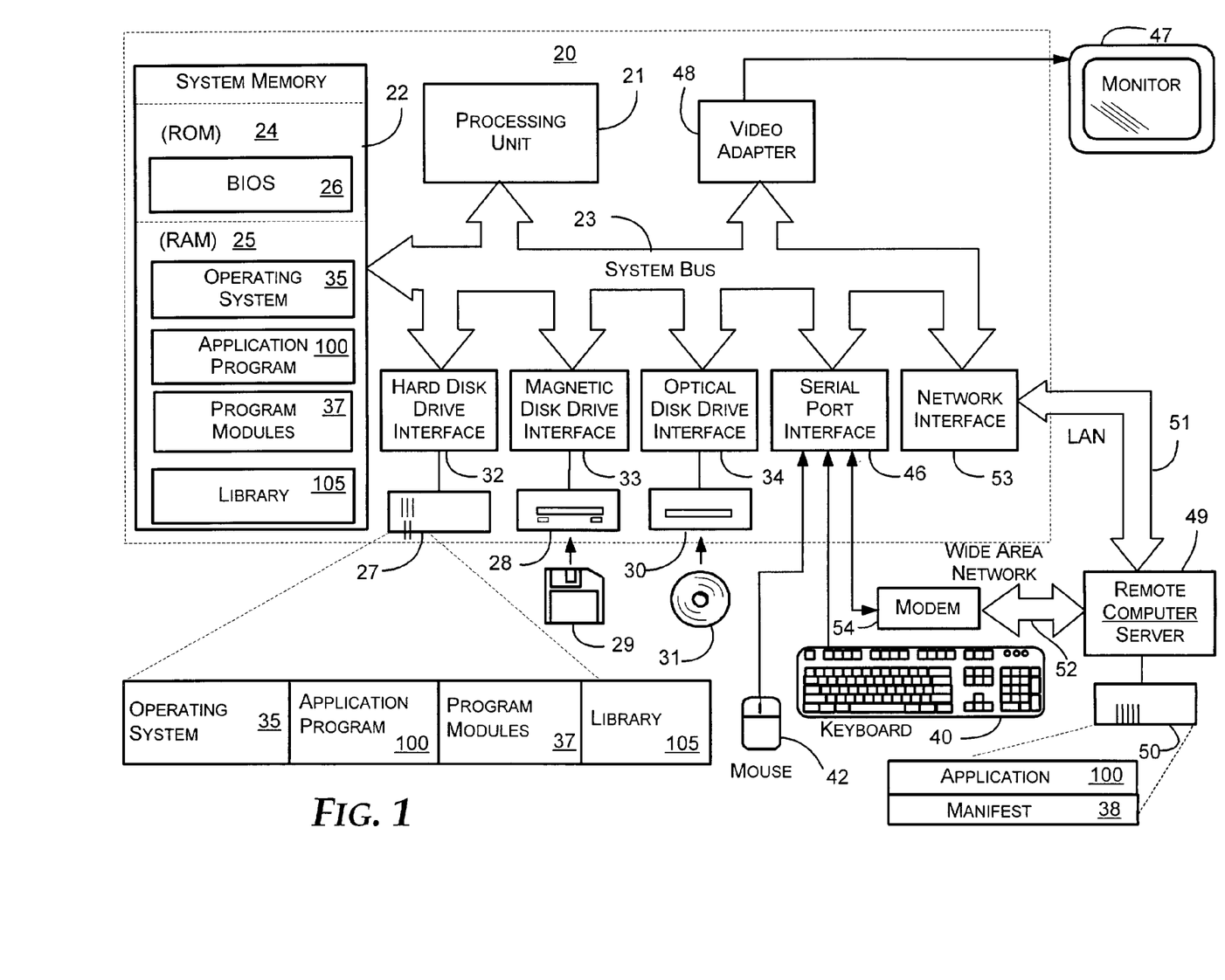
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
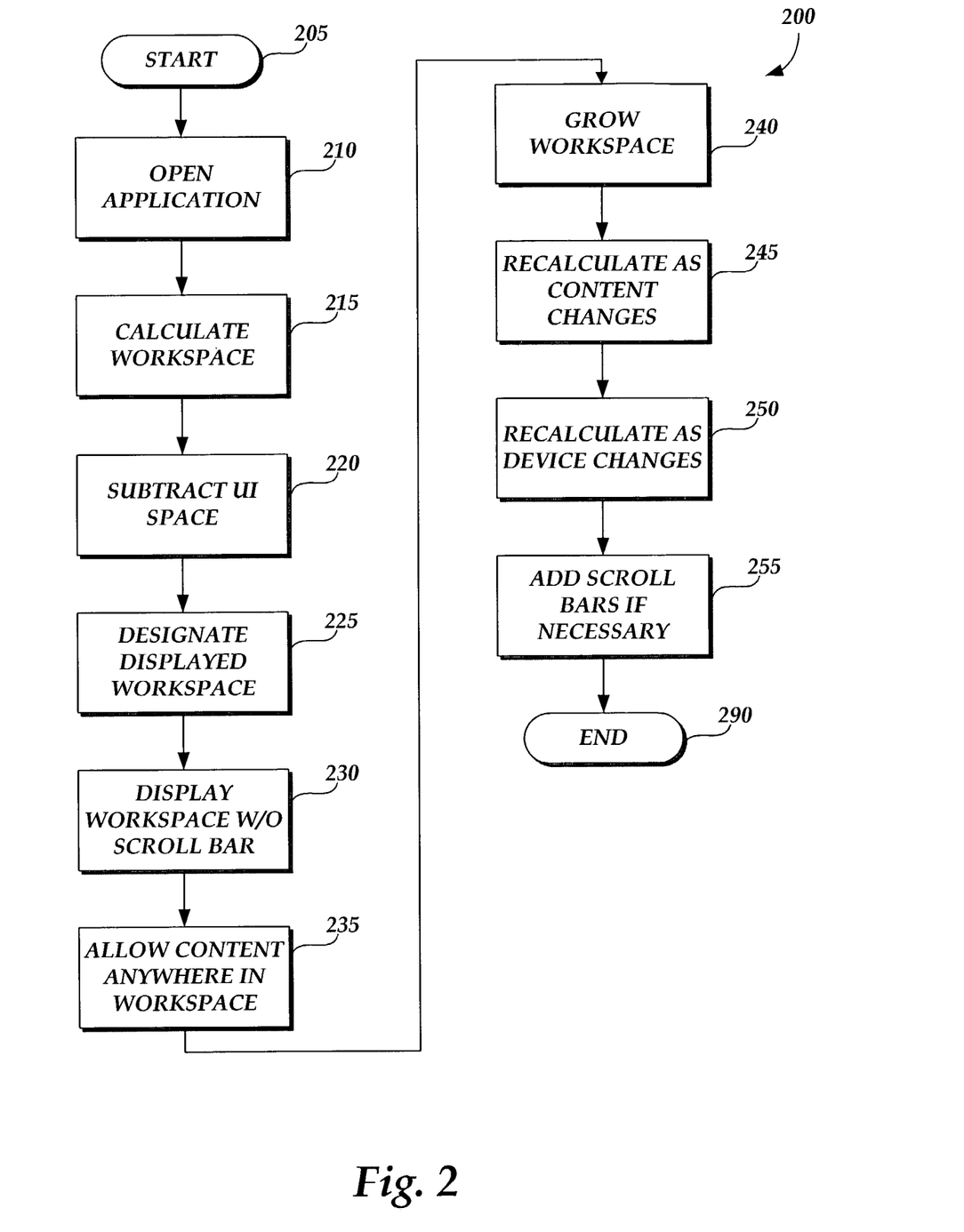
FIG. 2 is a flow chart illustrating steps performed by a method and system of the present invention for displaying the total available workspace available to a user of a computer-generated workspace.

FIG. 2 is a flow chart illustrating steps performed by a method and system of the present invention for displaying the total available workspace available to a user of a computer-generated workspace. For purposes of description, FIG. 2 is described with reference to FIGS. 3 through 7. Referring now to FIG. 2, the method 200 begins at start step 205 and proceeds to step 210 where the user of a computer software application, such as a word processing application opens the application to input data. As described briefly above, the data input method in use by the user may include keyboard entry, voice recognition entry, or handwriting recognition entry. At step 215, once the user opens the application, a calculation of the total available workspace is performed. According to an embodiment of the present invention, the calculation may be performed by a modular software routine or program such as an application programming interface (API) or a dynamically-linked library (DLL) available to the software application. That is, when the software application, such as a word processing application, is launched, the application may call on the separate software module for calculating the total available workspace available to the user. Alternatively, the software for calculating the total available workspace may be integrated with the software application in use by the user.

According to an embodiment of the present invention, the total available workspace calculated at step 215 is done with reference to the display device in use by the user. The screen resolution of the display device used by the user, for example, a 17-inch screen display, is calculated based on the operating system in use by the user and based on the display characteristics of the user's display. That is, the resolution available by the user's particular device may be calculated in terms of the pixels or dots per inch that are available on the user's device for displaying data and images.

Once the calculation is performed to determine the total available workspace depending on the user's display device, the method proceeds to step 220, and a determination is made as to the total space required for user interface objects that must be displayed according to the software application opened by the user at step 210. Once the total space required by user interface objects is calculated, that space is subtracted from the total available workspace, and at step 225, the remainder space is designated as displayed available workspace for use by the user. At step 230, the displayed available workspace along with any required user interface objects is displayed without scroll bars indicating additional space to the right, left, above, or below the displayed workspace.

Figure 3:
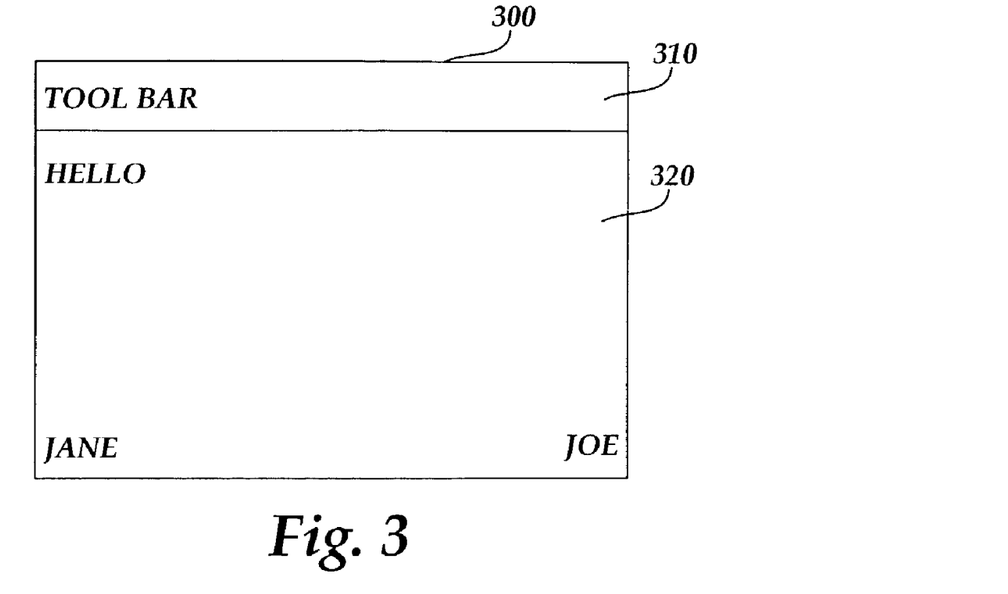
FIG. 3 illustrates a computer screen display showing a workspace for data entry according to an embodiment of the present invention.

Referring to FIG. 3, a software application display screen 300 is provided having a tool bar 310 and a workspace 320. According to an embodiment of the present invention, when the display screen 300 is displayed, a calculation of the total workspace less the area required for the tool bar 310 yields the total displayed available workspace 320 for input of data by the user. As shown in FIG. 3, no scroll bars are presented to the user, thus providing the user with an experience that the displayed workspace is the total workspace available to the user and that the user may in fact use all the displayed workspace.

Referring back to FIG. 2, at step 235, the user is allowed to input content anywhere in the workspace 320 using the user's available data entry method such as keyboard entry, or handwriting recognition entry. As shown in FIG. 3, the user enters the work "hello" in the upper left hand corner of the workspace 320, followed by the word "Jane" in the lower left hand corner of the workspace 320, followed by the word "Joe" in the lower right hand corner of the workspace 320. Referring back to FIG. 2, at step 240, the user is allowed to grow the page based on content. For example, referring back to FIG. 3, if the user decides to include the words "will meet us in the city" after the word "Joe," the user may simply position an editing insertion point, such as a curser or stylus, after the word "Joe" and begin entering the new text or data to create a sentence of "Joe will meet us in the city." Thus, a user may use the available workspace in a similar fashion as the user would use an infinitely sized sheet of paper on which the user is making notes. The user is not confined by any particular workspace size based on predetermined page sizes or margins.

Figure 4:
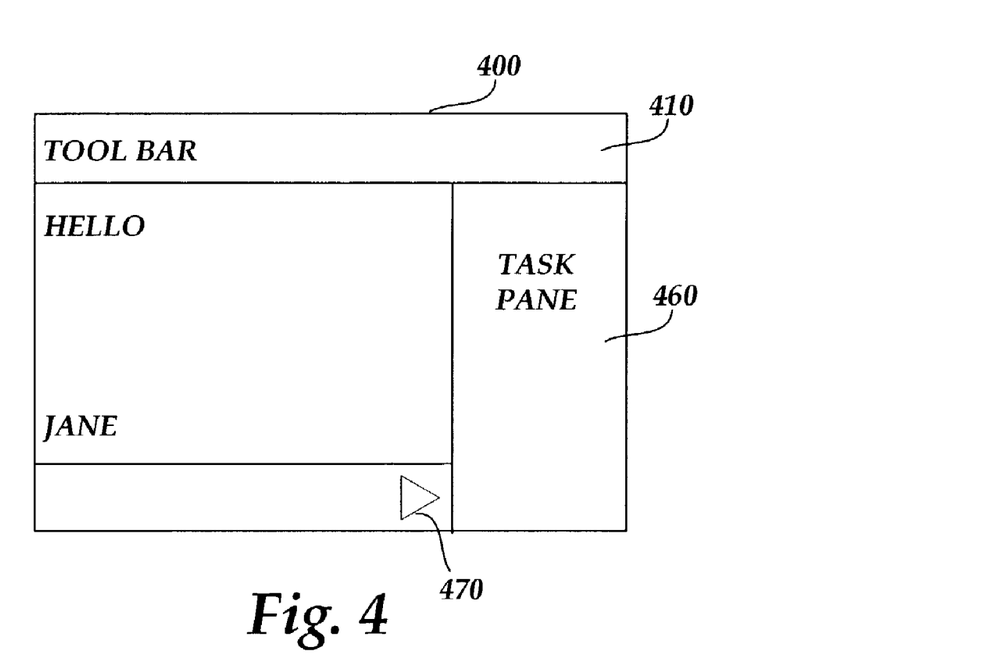
FIG. 4 illustrates the computer screen display showing a workspace and associated tool bar and task pane according to and embodiment of the present invention.

Likewise, the user may add data above, below or left of the displayed workspace. Once the user's data entry has moved beyond the displayed workspace, a scroll bar such as the scroll bar 470, illustrated in FIG. 4, is displayed on the lower side of the display pointing in the direction of content that is no longer visible in the displayed workspace. The scroll bar indicates only that content is available outside the displayed workspace as opposed to indicating that the currently displayed page includes preformatted margins outside the displayed workspace. As described in detail below, if the user copies the text from the current display device to a computing device having a larger display device, the displayed workspace is much larger than the displayed workspace of a smaller device. As illustrated in FIG. 3, the words "hello," "Jane," and the newly input text of "Joe" may be displayed in the visible displayed workspace of the larger display device without the use of scroll bars. Accordingly, the total available workspace and visible displayed workspace is never dependent upon preformatted margins or page sizes, but may be any size desired by the user and may be displayed to the user only limited by the size of the display screen on which it is displayed.

Referring back to FIG. 2, at step 245 a recalculation of the displayed workspace is performed anytime the content to be displayed changes requiring a recalculation of the workspace. As shown in FIG. 4, if the user launches a task pane 460, the task pane requires display space, thus removing display space from the workspace. As shown in FIG. 4, once the task pane 460 is displayed, the word "Joe" is cut off from visible display, and the scroll bar 470 is displayed to indicate that content is available to the right of the visible displayed workspace. Additionally, if the user moves a data object to a different location, the available workspace and the requirement for scroll bars may change. For example, referring to FIG. 4, if the user moves over to the word "Joe" hidden beneath the task pane 460 and moves that word to the left into the displayed workspace 420, the scroll bar 470 will be eliminated to once again present to the user that the available workspace is the displayed workspace visually available on the display.

Figure 5:
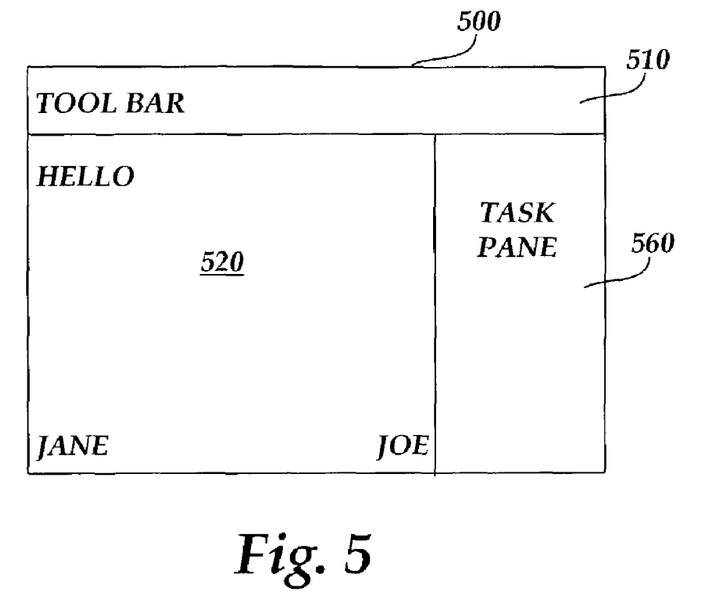
FIG. 5 illustrates the computer screen display of FIG. 4 displayed on a larger display device than the display device of FIG. 4.
Figure 6:
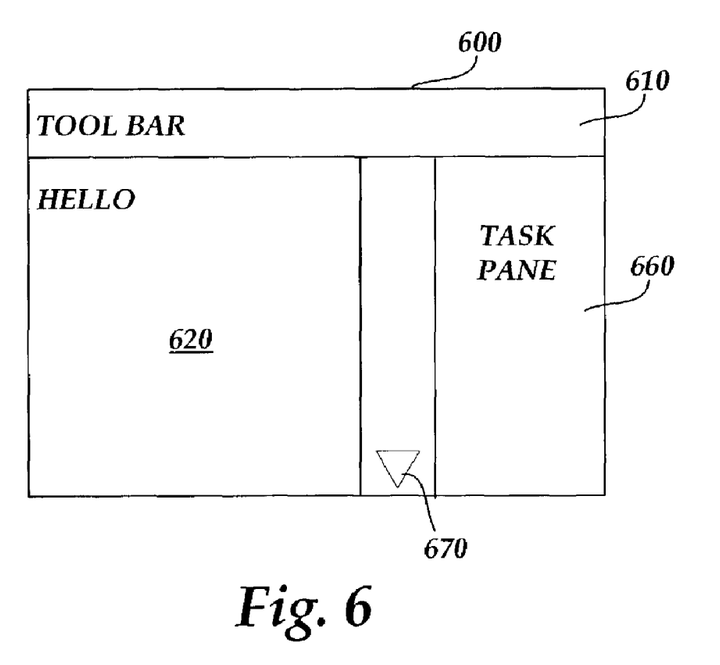
FIG. 6 illustrates a computer screen display of FIG. 4 displayed on a smaller display device than the display device for displaying the screen display of FIG. 4.

At step 250, a recalculation of the available workspace is performed anytime the data is moved to a different computing device having a different display device for displaying the data. As described above, if the data is displayed on a device having one size display device, such as a 15-inch screen display, where part of the data input by the user is off the displayed workspace to one side or another, and a scroll bar such as the scroll bar 470 is displayed, the displayed workspace is recalculated if that data is moved to and is displayed by a computing device having a larger display device, for example, a 21-inch screen display, as illustrated in FIG. 5. As illustrated in FIG. 5, once the data illustrated in FIG. 4 is moved to a computing device having a larger display device, the word "Joe" is now visible in the recalculated displayed workspace 520 available on the larger screen display 500. Likewise, referring to FIG. 6, if the data displayed in FIG. 5 is moved to a computing device such as laptop computer having a smaller vertical screen display, the text in a lower part of the document including the word "Jane" and the word "Joe" is no longer displayed in the displayed workspace 620. A vertical scroll bar 670 is introduced to the right side of the workspace 620 to indicate that content is available beneath the bottom portion of the displayed workspace.

Figure 7:
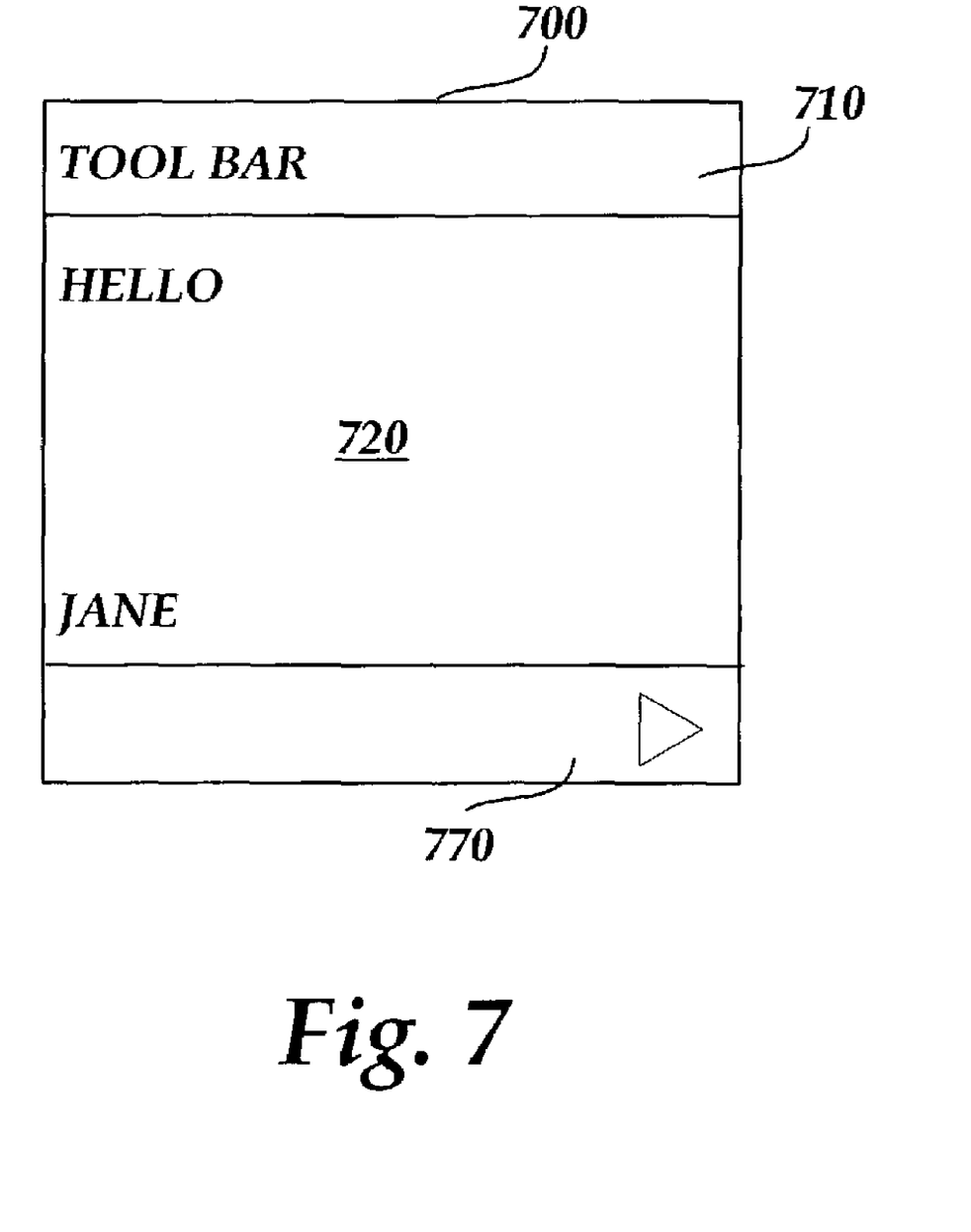
FIG. 7 illustrates the computer screen display of FIG. 4 displayed on a smaller display device than the device used for displaying the screen display of FIG. 4.

Referring to FIG. 7, if the data displayed on the display screen 500 is moved to a computing device having yet another size display screen, such as the hand-held computing device display screen 700, illustrated in FIG. 7, the text on the right hand side of the display screen including the word "Joe" is eliminated from the displayed workspace, and a scroll bar 770 is introduced to indicate that content is available to the right side of the displayed workspace. As described above with reference to FIGS. 3-7, scroll bars are added or removed to indicate content location and content changes without regard to preformatted page sizes or margins, but only to indicate that content is available above, below, to the right, or to the left of the displayed workspace.

As described, a method and system of the present invention allow for automatically resizing workspaces to allow a user to use as large a workspace as is needed by the user without regard to predetermined or preformatted page sizes or margins. Accordingly, the displayed workspace and the inclusion or elimination of scroll bars is interactive with the device on which it is displayed as opposed to predetermined page sizes or margins. According to embodiments of the present invention, the user is never provided the appearance of unavailable workspace beyond a set of margins or page limits by showing the user scroll bars to indicate space that may be used beyond the current space. Scroll bars are only presented to the user to indicate that content is included beyond the presently displayed workspace. According to an embodiment of the present invention, in an effort to provide as much data as possible in the visible displayed workspace, data may be zoomed down slightly to fit within the displayed workspace. For example, if a portion of the data is slightly larger than the displayed workspace, rather than truncating a portion of the data and including a scroll bar to indicate the existence of that data beyond the displayed workspace, the data may be zoomed down slightly to fit all the data in the displayed workspace.

If a user moves all the data displayed in the displayed workspace to an area above, below, to the right, or to the left of the current displayed workspace, the displayed workspace moves with the data, and after the data is moved, the new displayed workspace visually available to the user is the workspace in which the data has been moved. That is, according to an embodiment of the present invention, the data is not moved outside the visible displayed workspace followed by the inclusion of a scroll bar to indicate the existence to the data outside the displayed workspace, but the displayed workspace simply becomes a different area of the page where the data has now been moved.

It will be apparent to those skilled in the art of the various modifications or variations may be made in the present invention without departing from the scope or spirit of the invention. Other embodiments of the invention will be apparent to those skilled in the art from consideration of the specification and practice of the invention disclosed herein.

We claim:

1. A method of automatically sizing a computer-generated workspace, comprising:
    opening a software application having a workspace;
    calculating a first total available space provided by a first computer display device for displaying the workspace; wherein the first total available space is a total viewable area of the first computer display device;
    calculating a total space required for display of graphical user interface elements associated with displaying the workspace;
    subtracting the total space required for displaying the graphical user interface elements from the first total available space provided by a first computer display;
    designating the difference between the first total available space and the total space required for graphical user interface elements as the workspace such that the combination of the workspace and the graphical user interface elements coincides with the total viewable area of the first computer display device;
    receiving a user input adding content to the workspace that requires an area greater than the workspace, wherein the workspace is extensible in all directions such that content is movable to the left, right, above and below any location within the workspace; wherein the user input includes a user command adding text to a word processing document;
    automatically triggering a recalculation of the workspace in response to the received user input; wherein the workspace is defined independent of a reference to a physical paper size and the workspace comprises a single workspace not separated into multiple pages such that text is entered without regard to margins or paper dimensions; and wherein the recalculation is triggered in response to an addition of text into the workspace and triggered independent of a user input directly indicating a command to increase the size of the workspace; wherein the workspace is increased in a horizontal direction when the user input exceeds a horizontal boundary of the workspace before recalculation and wherein the workspace is increased in a vertical direction when the user input exceeds a vertical boundary before recalculation; and
    determining whether data is outside of a visible portion of the workspace;
    in response to determining a portion of data is partially outside the visible portion of the workspace:
        zooming such that all of the data is displayed in the visible portion of the workspace; and
    in response to determining data is moved outside of the visible portion of the workspace:
        moving the visible portion of the workspace such that the data moved outside of the visible portion of the workspace is displayed; and
        adding a scroll bar to the workspace.

2. The method of claim 1, wherein calculating total space required for graphical user interface elements includes calculating total space required for presentation of tool bars by the software application.

3. The method of claim 1, wherein calculating total space required for graphical user interface elements includes calculating total space required for presentation of task panes presented by the software application.

4. The method of claim 1, further comprising:
    allowing data to be entered at any location within the workspace.

5. The method of claim 4, further comprising:
    allowing data to be entered by keyboard entry.

6. The method of claim 4, further comprising:
    allowing data to be entered by handwriting recognition entry.

7. The method of claim 1, further comprising:
    recalculating the workspace if additional space is required to display additional graphical user interface elements.

8. The method of claim 7, whereby if recalculating the workspace causes data previously entered in the workspace to be contained in the workspace, but outside a displayed workspace, adding a scroll bar to indicate the presence of data entered in the workspace, but outside the displayed workspace.

9. The method of claim 8, further comprising:
displaying the software application and the first data entry on a second computer display device having different display space than the first computer display device; and
designating a second workspace for the second computer display device.

10. The method of claim 9, wherein designating a second workspace for the second computer display device includes:
calculating a second total available space provided by the second computer display device for display of the workspace
calculating a total space required for display of graphical user interface elements associated with displaying a second workspace on the second computer display device;
subtracting the total space required for displaying the graphical user interface elements from the second total available space provided by a second computer display device;
designating the difference between the first total available space and the total space required for graphical user interface elements as the second workspace; and
displaying the second workspace.

11. The method of claim 10, whereby if data entered in the available workspace is opened on the second computer display device having different display space than the first computer display device and the data requires space greater than a second displayed workspace, displaying a scroll bar on the second workspace to indicate the presence of data in an available workspace on the second computer display device located outside the second displayed workspace.

12. The method of claim 1, wherein the received user input comprises the input of characters.

13. A method of automatically sizing a computer-generated workspace, comprising the steps of:
calculating a first total available space provided by a first computer display device for displaying a workspace; wherein the first total available space is a total viewable area of the first computer display device;
calculating a total space required for display of graphical user interface elements associated with displaying the workspace;
subtracting the total space required for displaying the graphical user interface elements from the first total available space provided by a first computer display;
designating the difference between the first total available space and the total space required for graphical user interface elements as the workspace such that the combination of the workspace and the graphical user interface elements coincides with the total viewable area of the first computer display device;
receiving a user input adding content to the workspace that requires an area greater than the workspace, wherein the workspace is extensible in all directions such that content is movable to the left, right, above and below any location with the workspace;
automatically triggering a recalculation of the workspace in response to the received user input; wherein the workspace is increased in a horizontal direction when the user input exceeds a horizontal boundary of the workspace before recalculation and wherein the workspace is increased in a vertical direction when the user input exceeds a vertical boundary before recalculation; and
determining whether data is outside of a visible portion of the workspace;
in response to determining a portion of data is partially outside the visible portion of the workspace:
zooming such that all of the data is displayed in the visible portion of the workspace; and
in response to determining data is moved outside of the visible portion of the workspace:
moving the visible portion of the workspace such that the data moved outside of the visible portion of the workspace is displayed; and
adding a scroll bar to the workspace.

14. The method of claim 13, wherein the received user input comprises the input of text.

15. A computer-readable medium containing instructions which when executed by a computer perform a method of automatically sizing a computer-generated workspace, the method comprising:
opening a computer software application having a workspace;
calculating a first total available space provided by a first computer display device for displaying the workspace; wherein the first total available space is a total viewable area of the first computer display device;
calculating a total space required for display of graphical user interface elements associated with displaying the workspace;
subtracting the total space required for displaying the graphical user interface elements from the first total available space provided by a first computer display device;
designating the difference between the first total available space and the total space required for graphical user interface elements as the workspace such that the combination of the workspace and the graphical user interface elements coincides with the total viewable area of the first computer display device;
receiving a user input adding content to the workspace that requires an area greater than the workspace to be displayed, wherein the workspace is extensible in all directions such that content is movable to the left, right, above and below any location with the workspace;
automatically triggering a recalculation of the workspace in response to the received user input; wherein the recalculation comprises increasing the size of the workspace such that a portion of the workspace may not be displayed and adding a scroll bar; wherein the workspace is increased in a horizontal direction when the user input exceeds a horizontal boundary of the workspace before recalculation and wherein the workspace is increased in a vertical direction when the user input exceeds a vertical boundary before recalculation; and
determining whether data is outside of a visible portion of the workspace;
in response to determining a portion of data is partially outside the visible portion of the workspace:
zooming such that all of the data is displayed in the visible portion of the workspace; and
in response to determining data is moved outside of the visible portion of the workspace:
moving the visible portion of the workspace such that the data moved outside of the visible portion of the workspace is displayed; and
adding a scroll bar to the workspace.

16. The method of claim 15, wherein calculating total space required for graphical user interface elements includes calculating total space required for presentation of tool bars by the software application.

17. The method of claim 15, wherein calculating total space required for graphical user interface elements includes calculating total space required for presentation of task panes presented by the software application.

18. The method of claim 15, further comprising:
allowing data to be entered at any location within the workspace.

19. The method of claim 18, wherein allowing data to be entered at any location within the workspace includes allowing data to be entered by keyboard entry.

20. The method of claim 18, wherein allowing data to be entered at any location within the workspace includes allowing data to be entered by handwriting recognition entry.

21. The method of claim 15, further comprising:
recalculating the workspace if additional space is required to display additional graphical user interface elements.

22. The method of claim 21, whereby if recalculating the workspace causes data previously entered in the workspace to be contained in the workspace, but outside a displayed workspace, adding a scroll bar to indicate the presence of data entered in the workspace, but outside the displayed workspace.

23. The method of claim 22, whereby if the software application and data entered in the available workspace are launched on a second computer display device having different display space than the first computer display device, designating a second workspace for the second computer display device.

24. The method of claim 23, wherein designating a second workspace for the second computer display device includes:
calculating a second total available space provided by the second computer display device for display of the workspace
calculating a total space required for display of graphical user interface elements associated with displaying a second workspace on the second computer display device;
subtracting the total space required for displaying the graphical user interface elements from the second total available space provided by a second computer display device;
designating the difference between the first total available space and the total space required for graphical user interface elements as the second workspace; and
displaying the second workspace.

25. The method of claim 24, whereby if data entered in the workspace is opened on the second computer display device having different display space than the first computer display device and the data requires space greater than the second workspace, displaying a scroll bar on the second workspace to indicate the presence of data in the workspace on the second computer display device located outside a portion of the second workspace displayed.

26. The computer-readable medium of claim 15, wherein the received user input comprises the input of text.

27. A method of automatically sizing a computer-generated workspace, comprising:
providing a computer-generated workspace;
calculating a first total available space provided by a first computer display device for displaying the workspace; wherein the first total available space is a total viewable area of the first computer display device;
calculating a total space required for display of graphical user interface elements associated with displaying the workspace;
subtracting the total space required for displaying the graphical user interface elements from the first total available space provided by a first computer display;
designating the difference between the first total available space and the total space required for graphical user interface elements as the workspace such that the combination of the workspace and the graphical user interface elements coincides with the total viewable area of the first computer display device;
receiving a user input adding content to the workspace that requires an area greater than the workspace, wherein the workspace is extensible in all directions such that content is movable to the left, right, above and below any location with the workspace;
automatically triggering a recalculation of the workspace in response to the received user input; wherein the recalculation comprises increasing the size of the workspace such that a portion of the workspace may not be displayed and adding a scroll bar; wherein the workspace is increased in a horizontal direction when the user input exceeds a horizontal boundary of the workspace before recalculation and wherein the workspace is increased in a vertical direction when the user input exceeds a vertical boundary before recalculation;
providing voice recognition data entry;
determining whether data is outside of a visible portion of the workspace;
in response to determining a portion of data is partially outside the visible portion of the workspace:
zooming such that all of the data is displayed in the visible portion of the workspace; and
in response to determining data is moved outside of the visible portion of the workspace:
moving the visible portion of the workspace such that the data moved outside of the visible portion of the workspace is displayed; and
adding a scroll bar to the workspace.

28. A computer-readable medium containing instructions which when executed by a computer perform a method of automatically sizing a computer-generated workspace, the method comprising:
providing a computer-generated workspace;
calculating a first total available space provided by a first computer display device for displaying the workspace; wherein the total available space is a total viewable area of the first computer display device;
calculating a total space required for display of graphical user interface elements associated with displaying the workspace;
subtracting the total space required for displaying the graphical user interface elements from the first total available space provided by a first computer display;
designating the difference between the first total available space and the total space required for graphical user interface elements as the workspace such that the combination of the workspace and the graphical user interface elements coincides with the total viewable area of the first computer display device;
receiving a user input adding content to the workspace that requires an area greater than the workspace, wherein the workspace is extensible in all directions such that content is movable to the left, right, above and below any location with the workspace;
automatically triggering a recalculation of the workspace in response to the received user input; wherein the recalculation comprises increasing the size of the workspace such that a portion of the workspace may not be displayed and adding a scroll bar; wherein the workspace is increased in a horizontal direction when the user input exceeds a horizontal boundary of the workspace before recalculation and wherein the workspace is increased in a vertical direction when the user input exceeds a vertical boundary before recalculation;
providing voice recognition data entry;
determining whether data is outside of a visible portion of the workspace;

in response to determining a portion of data is partially outside the visible portion of the workspace:
   zooming such that all of the data is displayed in the visible portion of the workspace; and
in response to determining data is moved outside of the visible portion of the workspace:
   moving the visible portion of the workspace such that the data moved outside of the visible portion of the workspace is displayed; and
   adding a scroll bar to the workspace.

* * * * *